June 17, 1924.
W. SURY
1,497,746
TOOL HOLDER
Filed Nov. 28, 1922
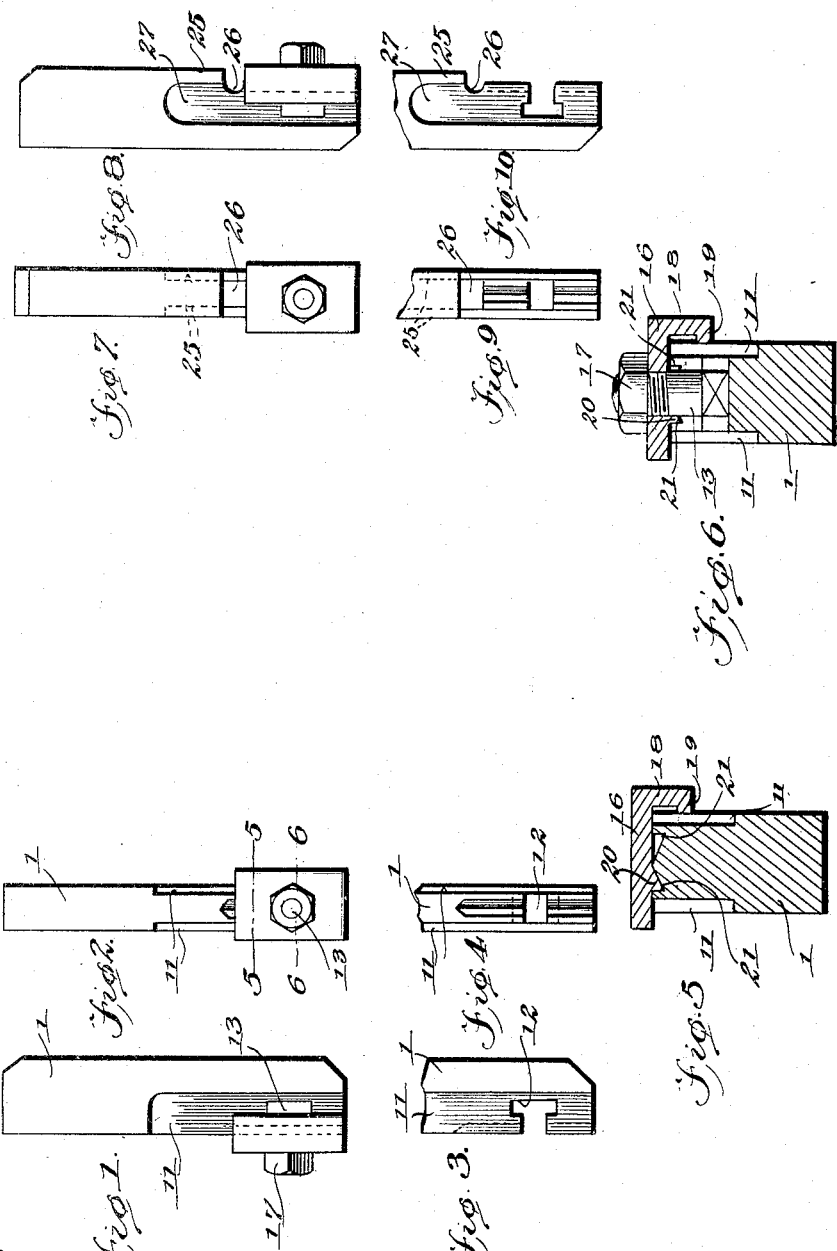
WITNESSES
INVENTOR
Walter Sury,
BY
ATTORNEYS Patented June 17, 1924.

1,497,746

UNITED STATES PATENT OFFICE.

WALTER SURY, OF PIETERLEN, SWITZERLAND.

TOOL HOLDER.

Application filed November 28, 1922. Serial No. 603,874.

*To all whom it may concern:*

Be it known that I, WALTER SURY, a citizen of Switzerland, and a resident of Pieterlen, State Bern, Switzerland, have invented certain new and useful Improvements in Tool Holders, of which the following is a specification.

My invention is an improvement in tool holders of the type forming the subject-matter of my co-pending application, filed Nov. 26, 1920, Serial No. 426,515, patented December 26, 1922, and numbered 1,440,187, and of which this application is a continuation in part, and has for its object to provide a holder of the character specified, adapted for use with lathes, planers, boring machines, and the like, for firmly holding the tool in any desired position and for inside or outside cutting.

Other objects and advantages of the invention reside in certain novel features of the construction, combination and arrangement of parts which will be hereinafter more fully described and particularly pointed out in the appended claims, reference being had to the accompanying drawings forming part of this specification, and in which:

Figure 1 is a view in side elevation of the improved tool;

Figure 2 is a plan view;

Figure 3 is a fragmentary view similar to Figure 1, parts being removed for the sake of illustration;

Figure 4 is a fragmentary view similar to Figure 2, parts being removed for the sake of illustration;

Figure 5 is a view in section on line 5—5 of Figure 2;

Figure 6 is a view in section on line 6—6 of Figure 2;

Figure 7 is a plan view, showing a slightly modified form of the improved tool;

Figure 8 is a view of the tool shown in Figure 7 in side elevation;

Figure 9 is a fragmentary view similar to Figure 7, parts being removed for the sake of illustration; and Figure 10 is a fragmentary view similar to Figure 8, parts being removed for the sake of illustration.

In the embodiment of the invention shown in Figs. 1 to 6, inclusive, the improved holder comprises a body 1 of suitable cross section and length.

At one end, the body is cut away on each side, as indicated at 11, the said cutaway portions extending over about half the length of the body, and about three-fourths of the width, and near the end the body has a transverse under-cut groove 12. This groove is adapted to receive a bolt 13, the walls of the groove being undercut to receive the head of the bolt, and a plate 16 is mounted on the upper edge of the body, the plate having an opening for receiving the bolt 13, which is engaged by a nut 17 above the plate.

The plate has a depending web 18 at one side, and the web has an inwardly extending rib 19 at its lower edge, which extends in far enough to be flush with the face of the body. This rib 19 is adapted to clamp the tool in the cutaway portion 11 at either side, for the plate 16 is reversible. This plate has a depending tooth 20 intermediate its side edges, and intermediate its ends, and this tooth is adapted to engage one of a pair of grooves 21 on the upper edge of the body.

As clearly shown in Figures 5 and 6, the tooth is right-triangular, having one face perpendicular to the plate and one face inclined with respect thereto, and the grooves 21 are similarly shaped. By loosening the nut, the plate may be loosened. To loosen the tool held in the cut-away portions 11, the nut is loosened and the bolt is moved laterally in the groove 13.

The embodiment of the invention shown in Figures 7 to 10, inclusive is identical in all respects with the tool shown in Figures 1 to 6 and herein-above described except that in lieu of forming the recesses 11 entirely open there is provided for these recesses flanges 25. The flanges 25 terminate at points spaced from the adjacent end of the plate 16 and the body 1 of the tool between the flanges and the plate is formed with a transverse slot or recess 26. The flanges 25 define enclosed spaces 27. (See Figures 8 and 10.) This form of tool is designed for the protection and advantage of the mechanic, the flanges, enclosed spaces and recesses precluding the possibility of the tool injuring the workmen and at the same time rendering the adjustment and manipulation thereof easier while enhancing the general efficiency of the device.

I claim:

1. A tool holder of the character specified, having at one end a transverse undercut groove, a headed bolt adjustably mounted within the groove, a plate having a depending inturned flange for engaging the tool and an opening for receiving the bolt, a nut on the bolt, said plate and holder having cooperating means for forcing the inturned flange toward the holder when the nut is tightened said cooperating means including a V-shaped rib carried by the plate, said holder being provided with correspondingly shaped grooves with which the V-shaped rib is selectively cooperable, the sides of the holder being cut away for receiving a tool between the inturned flanges and the holder.

2. A tool holder of the character specified including a body having its sides cut away to define tool receiving spaces in which a tool is adapted to be mounted, said body being formed with flanges enclosing parts of said tool receiving spaces, a plate having tool engaging means and means for releasably securing the plate to the body, said body being provided with a transverse recess intermediate the flanges and the adjacent edge of said plate.

WALTER SURY.